United States Patent
Tecchiolli et al.

(10) Patent No.: US 6,930,597 B2
(45) Date of Patent: Aug. 16, 2005

(54) ELECTRO-OPTICAL DEVICE FOR THE ACQUISITION AND PROCESSING OF IMAGES

(75) Inventors: Giampietro Tecchiolli, Trento (IT); Alvise Sartori, Povo (IT)

(73) Assignee: Neuricam SpA, Trento (IT)

( * ) Notice: Subject to any disclaimer, the term of this patent is extended or adjusted under 35 U.S.C. 154(b) by 41 days.

(21) Appl. No.: 10/410,266

(22) Filed: Apr. 10, 2003

(65) Prior Publication Data

US 2003/0193561 A1 Oct. 16, 2003

(30) Foreign Application Priority Data

Apr. 12, 2002 (IT) ................................. UD2002A000085

(51) Int. Cl.[7] ............................................. G08B 23/00
(52) U.S. Cl. ..................... 340/517; 340/518; 348/294; 348/308; 356/73; 356/343
(58) Field of Search ................................ 348/294, 308; 340/517, 518, 523, 286.02, 3.6; 356/73, 343; 706/15, 25, 26; 382/155, 157; 341/51

(56) References Cited

U.S. PATENT DOCUMENTS 5,245,337 A * 9/1993 Bugajski et al. .............. 341/51
5,712,922 A * 1/1998 Loewenthal et al. ........ 382/155
5,812,993 A * 9/1998 Ginosar et al. ................ 706/26
6,072,528 A 6/2000 Nakamura ................... 348/308
6,122,042 A * 9/2000 Wunderman et al. .......... 356/73

FOREIGN PATENT DOCUMENTS

| EP | 0989741 | 3/2000 |
|----|---------|--------|
| EP | 1093048 | 4/2001 |
| EP | 1301027 | 9/2003 |
| WO | 9824186 | 6/1998 |

OTHER PUBLICATIONS

S. Espejo et al., "Smart –Pixel Cellular Neural Networks in Analog Current–Mode CMOS Technology", Aug. 1994, pp. 895–904.

* cited by examiner

Primary Examiner—Van T. Trieu
(74) Attorney, Agent, or Firm—Stevens, Davis, Miller & Mosher, LLP

(57) ABSTRACT

Electro-optical device for the acquisition and processing of images, provided with an image acquisition unit and a calculator unit. The calculator unit comprises at least a neural-type processor. The image acquisition unit and the calculator unit are made using CMOS technology, and are integrated on the same silicon support element to implement the device in a single microchip.

17 Claims, 2 Drawing Sheets

ELECTRO-OPTICAL DEVICE FOR THE ACQUISITION AND PROCESSING OF IMAGES

FIELD OF THE INVENTION

The present invention concerns an electro-optical device for the acquisition, memorization and processing of images, made by means of high integration CMOS technology. The device consists of optical sensor means able to acquire images and at least an electronic digital calculator unit able to process the images using techniques based on the use of neural networks.

Using the same silicon production technology, both for the image detection part and also for the processing part, allows to integrate all the components on a single integrated circuit or microchip, with considerable advantages in terms of space and operating efficiency.

The invention is preferentially applied in the field of biometry, surveillance, household robotics and intelligent sensors for motor vehicles, or similar.

BACKGROUND OF THE INVENTION

The state of the art includes optical devices for the acquisition and processing of images, for example those used for domestic and public surveillance or similar, consisting substantially of digital video cameras able to acquire images, normally made with the technology known as CCD (Charge-Coupled Device). CCD sensors, however, have various disadvantages, such as high energy consumption and considerable dimensions, and the devices which incorporate them are of no negligible weight, have a high number of components and consequently a very complex system, which can also result in possible problems of reliability.

Moreover, the constructive technology of CCDs does not allow to integrate optical sensors and processing systems on the same silicon platelet, or microchip, so that devices which incorporate them are usually formed by at least two distinct and physically separate elements, the electro-optical detection part and the calculator units able to process the images acquired and to send them to display means.

WO-A-98/24186 discloses an imaging device which integrates on a single substrate a photosensing array, an analog-to digital converter and an encryption circuit. However, this document does not disclose the integration on a single chip or substrate of an optical device and of a processing or calculation unit able to extrapolate the information from the images taken by the optical device.

EP-A-1.093.048 discloses an accessory for use with digital personal assistant device, comprising a computer vision system which includes a sensor for acquiring images and a vision microprocessor coupled to the sensor. This document discloses a discrete system and not a single-chip integrated vision and processing system.

EP-A-0.989.741 discloses a system comprising, in a single-chip, a sensor for acquiring images and an adjusting circuit for enhancing the resolution of the images. Again, this document does not disclose a processing integrated system to obtain information from images.

The present Applicant has devised and embodied this invention which solves said shortcomings of the state of the art and presents further advantages in terms of versatility in application and cost reduction.

SUMMARY OF THE INVENTION

The invention is set forth and characterized essentially in the main clam, while the dependent claims describe other innovative characteristics of the invention.

The purpose of the invention is to achieve an intelligent electro-optical device for integrated applications of artificial vision, which is limited in size, so that the potential uses can be extended, and which entails limited energy consumption, while still offering the power of calculation needed to manage and process the data sent by the optical sensor.

Another purpose is to provide a device integrated in a single chip and able to extrapolate the informative content from the images acquired by an optical sensor without needing an high resolution of the images themselves.

In accordance with this purposes, the intelligent electro-optical device according to the present invention comprises at least an image acquisition unit and at least a calculator and processing unit integrated on the same silicon support element; both said main components are made using CMOS technology, are suitably connected to each other and each have a specific function.

According to one characteristic, the image acquisition unit comprises a vision sensor composed of a matrix of active pixel light-sensitive elements, which provide to convert the light radiation into an electric signal. The light-sensitive elements are associated with elements to select the light-sensitive element desired in arbitrary order. The image acquisition unit also comprises, in conventional fashion, a unit to amplify the electric signal and an analogical-digital converter.

According to another characteristic of the invention, the calculator unit comprises at least a neural type processor, able to extrapolate a desired informational content of the images acquired by the electro-optical unit.

In a preferential embodiment the calculator unit consists substantially of:

- a sequential microprocessor, for example of the Von Neumann RISC type;
- said parallel processor containing artificial neural networks;
- an interface to a volatile memory outside the integrated circuit able to memorize data and programs in execution (RAM);
- an interface to an outer non-volatile memory able to memorize programs and parameters of regulation and calibration (FLASH);
- an interface to communicate with other external devices.

The use of CMOS technology to make both the image acquisition unit and the calculator unit allows to integrate both these functions on a single silicon substrate, achieving a device called SOC (System on Chip).

That is, the CMOS technology allows to implement, in a single silicon platelet of extremely small size and with extremely limited energy consumption, a system or artificial vision with a capacity of image interpretation which can be reprogrammed and reconfigured, by defining the connections of said neural processors with different algorithms according to the specific field of application.

To be more exact, the artificial neural network allows to extract synthetic descriptive characteristics and information from the images acquired, and then to implement in a flexible manner capacity of recognition and classification of objects and/or shapes according to sessions of learning from a series of examples. A processor capable of performing calculations of a neural type is therefore usable in a preferential manner for applications such as alarm systems, comparative surveillance systems and systems for the recognition and memorization of images.

BRIEF DESCRIPTION OF THE DRAWINGS

These and other characteristics of the present invention will be apparent from the following description of a preferential form of embodiment, given as a non-restrictive example with reference to the attached drawings wherein.

DETAILED DESCRIPTION OF A PREFERENTIAL EMBODIMENT

Figure 1:
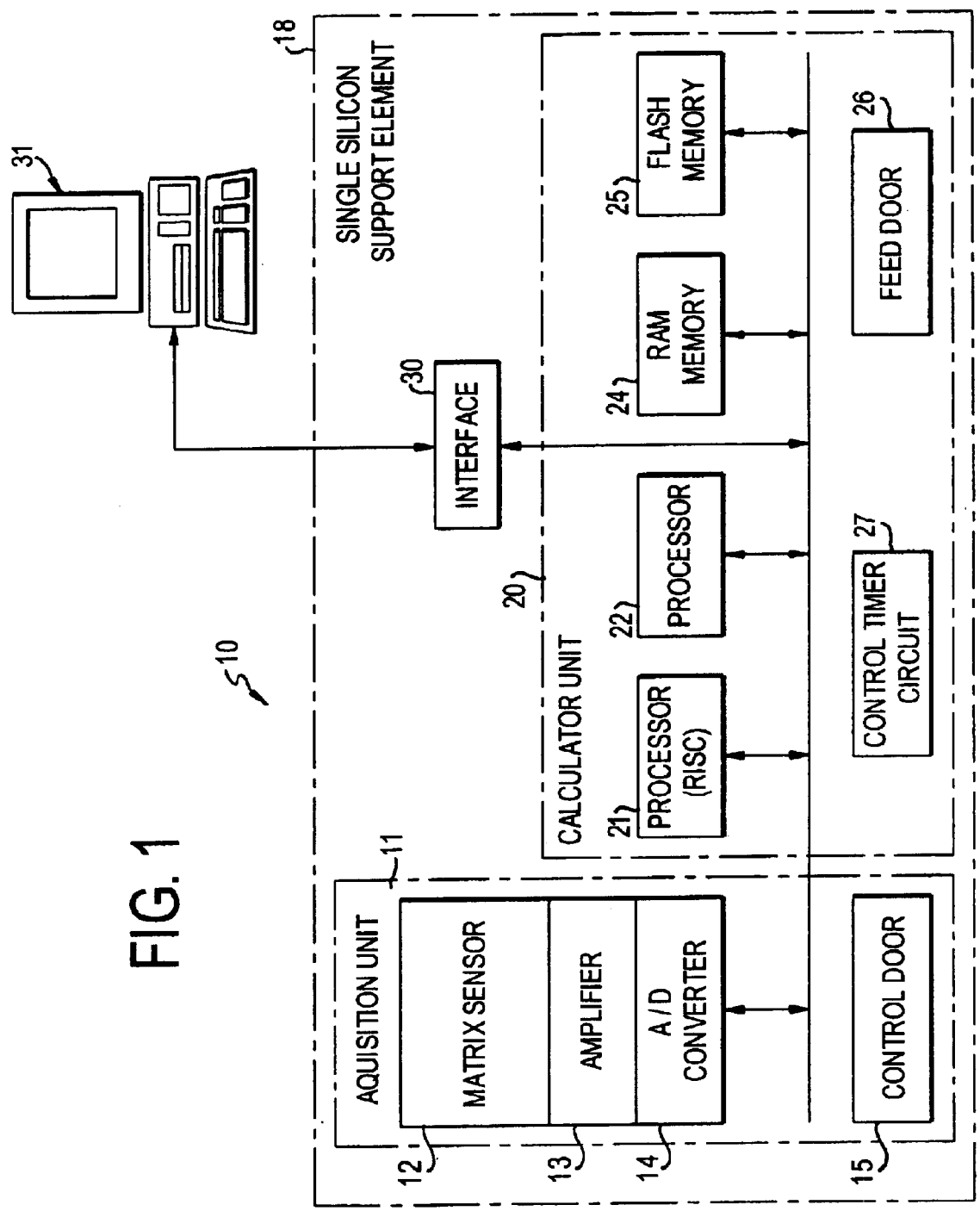
FIG. 1 shows a block diagram of the device according to the invention.

With reference to FIG. 1, the device 10 according to the invention comprises, as essential parts, an electro-optical unit 11 for the acquisition of images, a calculator unit 20 comprising at least a neural-type processor and a communication interface 30.

Both the image acquisition unit 11, the calculator unit 20 and the interface 30 are made using CMOS technology, and are integrated on a single silicon support element 18, so as to achieve a SOC type device (System on Chip) of extremely limited size and energy consumption. On the support element 18 is also provided at least a device for suppressing or reducing the noise generated by the digital devices, which noise may affect and compromise the correct operation of the analogic components and of the optical sensor.

The image acquisition unit 11 consists in this case of a matrix sensor 12 of the type with 320×256 active pixels with logarithmic response which allow to convert into an electric signal an electromagnetic radiation detected in the interval of the wavelength which goes from about 400 to about 1100 nm. The sensor 12 also comprises a selection element, not shown in detail here, to select the light-sensitive element in arbitrary order.

This element consists of a digital decoder able to translate an input code into a pair of coordinates (x, y) which univocally identify the position (by row and by column) of the light-sensitive element of the matrix to which access is desired.

An amplifier 13, able to locally amplify the signal, and an analogical-digital converter 14 able to quantize, for example into 1024 levels, the signals amplified, are also associated with the matrix sensor 12.

The calculator unit 20 comprises a first processor 21, a second parallel processor 22, a RAM type volatile memory 24, and a FLASH type non-volatile memory 25.

The first processor 21 is of the sequential type (RISC) and acts as a central calculator unit, or CPU, and also provides to manage the signal arriving from the sensor, memorizing the images in the RAM memory 24 and making them available for subsequent processing.

The parallel processor 22 is of the neural type and consists of 32 calculator units which implement MAC type operations (Multiplication and Accumulation) and of a unit, possibly excludable, to generate the transfer function of the neural network. The 32 calculator units are able to function as a battery of digital signal processors, called DSP, operating parallel or as layers of a neural network organized in a structure called multi-level perception.

Artificial neural networks in fact are computational structures on various levels, each of which is connected to the previous and subsequent by means of a parameterized transfer function.

Like their biological equivalents, artificial neural networks operate in two fundamental ways, training and recognition.

In the training step, a series of examples is given at inlet to the neural network and the output obtained is compared with the desired result: in accordance with a specified learning algorithm, the internal parameters, called weights, are modified until the error between the result obtained and the result desired stops decreasing.

In the recognition step, the data input into the network produce the desired output according to the weights memorized in the training step.

Artificial neural networks are particularly useful when the behavior of a system is not exactly known, or is too complex to be described in mathematical terms and/or to be resolved analytically. To solve these cases using a neural processor, it is enough simply to train the network with a sufficient number of typical examples, without having to write any equation.

Moreover, a peculiar characteristic of artificial neural networks is their ability to interpolate and extrapolate from known cases, so that they are able to supply optimized results even if the input data do not belong to the set of examples used for training.

In the case of the neural processor 22 used in this electro-optical device, the connections of the neural network are defined by means of a process of training which allows to classify and process signals arriving from the sensor 12 by means of different algorithms according to the application requested.

The FLASH memory 25 permanently memorizes programs, data and procedures to initialize the system. When switched on, the loading block transfers the programs, data and procedures from the FLASH memory 25 to the RAM memory 24 in which the programs are subsequently executed.

The calculator unit 20 also comprises a feed door 26 and a control timer circuit 27, which re-initializes and re-starts the calculator unit should it find itself in a stoppage for longer than a fixed limit.

Figure 3:
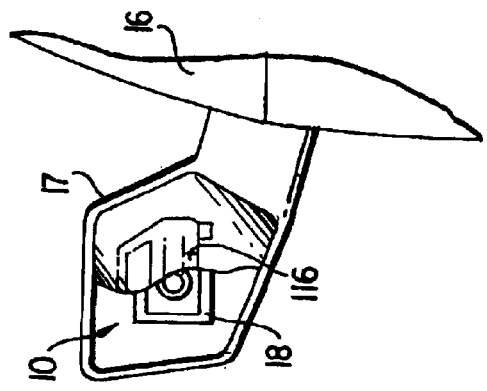
FIG. 3 shows an enlarged detail of FIG. 2.
Figure 2:
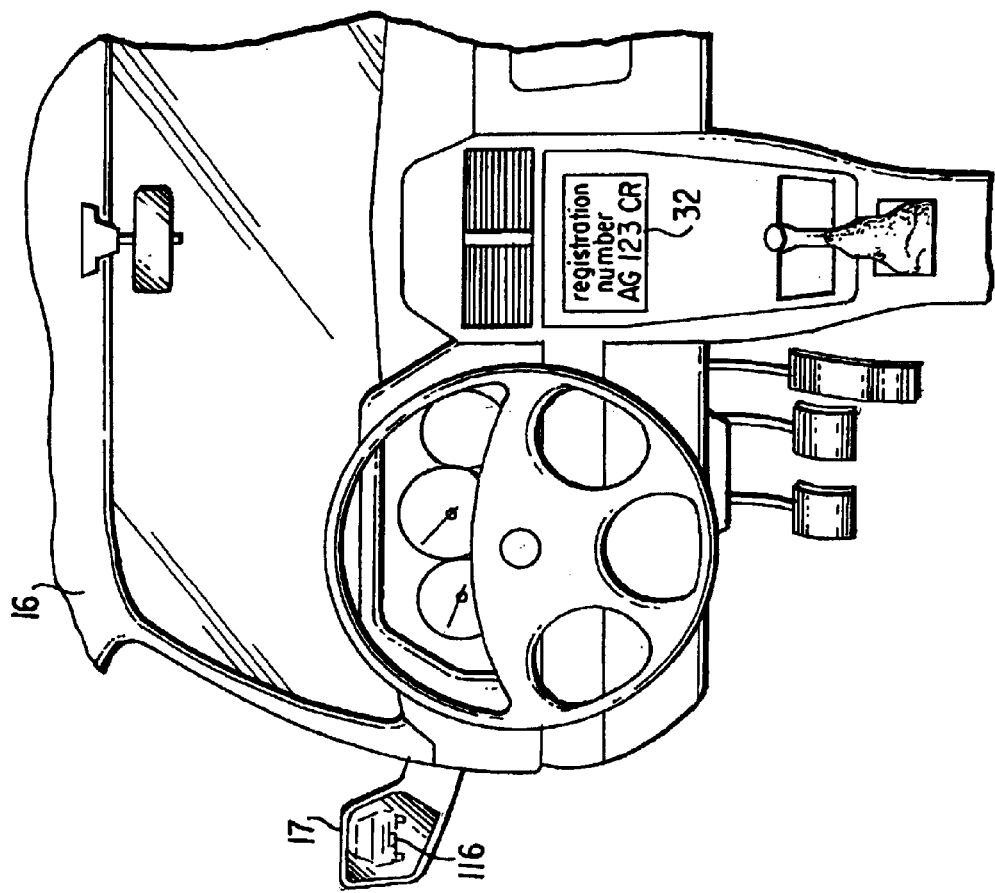
FIG. 2 shows the device in FIG. 1 applied to a motor vehicle.

FIGS. 2 and 3 show a device 10 according to the invention applied to a motor vehicle 16, such as an automobile, a truck, a motorcycle or similar.

This application provides to integrate the device 10 in a lateral rearview mirror 17 of the automobile 16 so that the electro-optical sensor 12 points towards the glass, for example to display another vehicle 116 which is overtaking, or road signs, or other indications which can be useful for the driver.

Thanks to the extremely small size and to the communication interface 30, the device 10 can be applied in a retracted position inside the mirror 17, or substantially at any other point of the vehicle 16 without creating problems of bulk or the need to modify the aesthetics of the vehicle 16 itself the device 10 can be connected to a possible external device 31, such as for example an on-board computer, which displays the data and required information through a display 32, in this case the registration number of the vehicle 116 overtaking.

The functioning of the device 10 can be monitored from outside by means of a parallel control door 15. Moreover, the images acquired are transferred through a series of digital lines, while the communication interface 30 provides to transfer commands to and from the external devices 31.

It is clear, however, that modifications and/or additions of parts may be made to the device 10 as described heretofore without departing from the field and scope of the present invention.

It is also clear that, although the present invention has been described with reference to specific examples, a person of skill in the art shall certainly be able to achieve many other equivalent forms of an electro-optical device for the acquisition and processing of images, all of which shall come with the field and scope of the present invention.

What is claimed is:

1. Electro-optical device for the acquisition and processing of images, comprising at least an image acquisition unit and at least a calculator unit, wherein said calculator unit includes at least a neural-type processor for extrapolating a desired informative content from the images acquired by said image acquisition unit and said image acquisition unit and said calculator unit are made using CMOS technology, and are integrated on a same silicon support element, to implement said electro-optical device in a single microchip.

2. Device as in claim 1, wherein said image acquisition unit comprises at least a vision sensor provided with a matrix of light sensitive elements with active pixels able to convert the light radiation into an electric signal.

3. Device as in claim 2, wherein said vision sensor comprises at least an element to select the desired light-sensitive element in arbitrary order.

4. Device as in claim 3, comprising at least a noise reducing device integrated on said silicon support.

5. Device as in claim 2, wherein said image acquisition unit comprises an amplification unit to amplify said electric signal converted by said vision sensor and an analogical-digital converter able to quantize into at least 1024 levels the signals amplified by said amplification unit.

6. Device as in claim 5, comprising at least a noise reducing device integrated on said silicon support.

7. Device as in claim 2, comprising at least a noise reducing device integrated on said silicon support.

8. A device of claim 2, wherein the calculator units are able to function as a battery of digital signal processors operating parallel or as layers of the neural network in a multi-level perceptron structure.

9. Device as in claim 1, wherein said calculator unit comprises a first sequential processor arranged in parallel to a second neural type processor.

10. Device as in claim 9, wherein said first sequential processor is of the RISC Von Neumann type.

11. Device as in claim 9, comprising at least a noise reducing device integrated on said silicon support.

12. Device as in claim 1, comprising at least a noise reducing device integrated on said silicon support.

13. Device as in claim 1, wherein said calculator unit comprises at least a volatile memory able to memorize data and execution programs.

14. Device as in claim 1, wherein said calculator unit comprises a non-volatile memory able to memorize programs and parameters of regulation and calibration.

15. Device as in claim 1, comprising a communication interface able to allow the connection of the electro-optical device with external devices.

16. A device comprising a rear-view mirror for a motor vehicle and the device of claim 1 attached to the rear-view mirror.

17. An artificial vision system comprising the device of claim 1.

* * * * *